United States Patent
Lambert et al.

(10) Patent No.: US 9,635,977 B2
(45) Date of Patent: May 2, 2017

(54) DEVICE AND SYSTEM FOR COOKING BACON WRAPPED FOODS

(71) Applicant: Enhance Product Development, Inc., Minneapolis, MN (US)

(72) Inventors: Trevor Lambert, Brooklyn Park, MN (US); Ty Joseph Caswell, Zimmerman, MN (US); Adam Elznic, Fargo, ND (US)

(73) Assignee: ENHANCE PRODUCT DEVELOPMENT, INC.

( * ) Notice: Subject to any disclaimer, the term of this patent is extended or adjusted under 35 U.S.C. 154(b) by 0 days.

(21) Appl. No.: 14/855,021

(22) Filed: Sep. 15, 2015

(65) Prior Publication Data

US 2016/0073822 A1    Mar. 17, 2016

Related U.S. Application Data

(60) Provisional application No. 62/051,136, filed on Sep. 16, 2014.

(51) Int. Cl.
*A47J 37/06* (2006.01)

(52) U.S. Cl.
CPC ................................ *A47J 37/0694* (2013.01)

(58) Field of Classification Search
CPC .............................. A47J 37/0694; A47J 37/06
USPC .......... 99/355, 400, 419, 421 V, 421 H, 426, 99/441; 219/385, 732
See application file for complete search history.

(56) References Cited

U.S. PATENT DOCUMENTS

| | | | | |
|---|---|---|---|---|
| 4,427,706 | A * | 1/1984 | El-Hag | A23L 1/0128 426/243 |
| 4,924,049 | A | 5/1990 | Dexter, Jr. | |
| 5,685,217 | A | 11/1997 | Kreitzer | |
| 5,843,500 | A | 12/1998 | Guarino | |
| 2008/0060530 | A1* | 3/2008 | Tetreault | A21B 3/138 99/355 |
| 2015/0208860 | A1* | 7/2015 | Parr | A47J 37/01 220/573.1 |

OTHER PUBLICATIONS

"Perfect Bacon Bowl," Amazon, retrieved from http://www.amazon.com/As-Seen-On-TV-PNO11124/dp/B00HDPMXOG on Dec. 8, 2015 (6 pages).

* cited by examiner

*Primary Examiner* — Thien S Tran
(74) *Attorney, Agent, or Firm* — Kagan Binder, PLLC

(57) ABSTRACT

Described herein is a cooking device for foodstuffs that are wrapped in bacon, dough or other food items. The device includes a tray that holds a number of silicone holders that hold bacon-wrapped food items while they cook in an oven or toaster oven, microwave or grill (where made of metal). The cooking holders or assemblies hold bacon wrapped food items upright and in place during the cooking process. The entire cooking holder is made of silicone so the food item slides easily off the cooking apparatus when cooking is complete. The cooking tray is designed to allow grease to flow away from the food into a reservoir located around the edges of the tray.

14 Claims, 9 Drawing Sheets

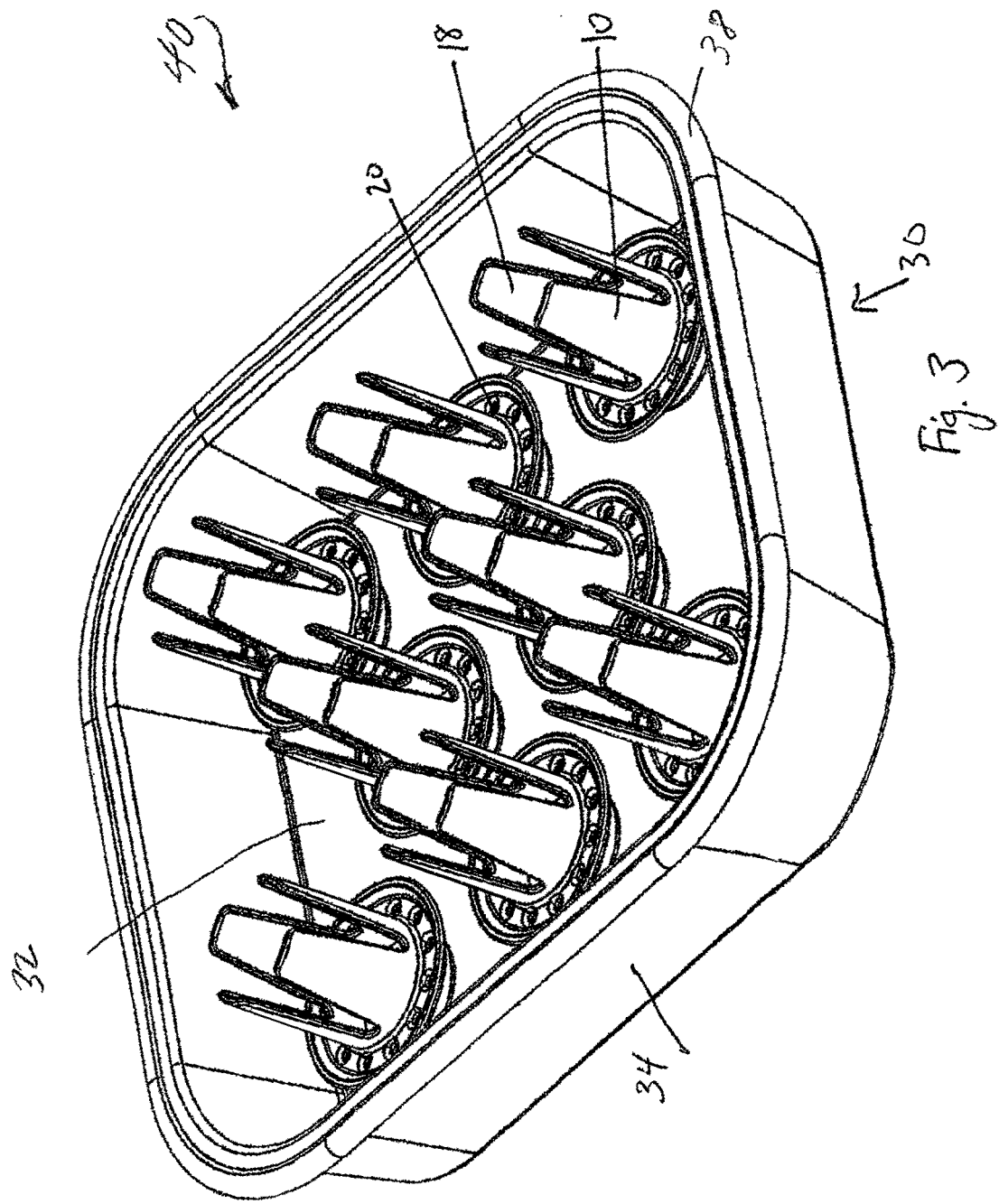

DEVICE AND SYSTEM FOR COOKING BACON WRAPPED FOODS

PRIORITY CLAIM

The present nonprovisional patent application claims the benefit of and priority to, under 35 USC §119(e), U.S. Provisional Patent Application No. 62/051,136, filed Sep. 16, 2014, entitled "COOKING DEVICE FOR BACON WRAPPED FOODS," the entirety of which is incorporated herein by reference.

FIELD OF THE INVENTION

The invention relates generally to a cooking device and system.

BACKGROUND

Currently there are a number of solutions for creating bacon-wrapped appetizers and entrées. Some of these solutions attempt to wrap bacon around food items and stick toothpicks through the bacon and the food, but this solution fails to meet the needs of the user because very often the bacon-wrapped item falls apart during the cooking process. Dough-wrapped food items can also fall apart in the cooking process. Attempts to use the same toothpick method also fail to meet the needs of the user yet again because even if the wrapped food item stays together during the cooking process, one side of the food item does not cook well or evenly and may end up getting soggy and greasy from resting (in bacon grease or food juices or fluids) on one side while it is on the baking sheet or pan. It would also be advantageous to be able to cook the food item and while capturing the food fluids or keeping the fluids or grease away from the cooked food item.

SUMMARY

It would be advantageous, as described herein, to have an apparatus that holds a bacon-wrapped food item upright (or at least suspend most of the food item from the bottom of the pan or sheet) and in place during the cooking process. Furthermore, it would also be advantageous to have an apparatus that is made of heat resistant material (metal, plastic or silicone) so the food item slides easily off the cooking apparatus when cooking is complete. Still further, it would be advantageous, as described herein, to have an apparatus that comes with a cooking tray that is designed to pull grease (and other fluids) away from the food into a reservoir around the edges of the tray while the food is cooking. Therefore, there currently exists a need in the market for an apparatus that is a tray or pan that holds a number of silicone holders (or other materials) created to hold bacon-wrapped food items while the food cooks in an oven or toaster oven or even a microwave or an outdoor grill or smoker.

The invention advantageously fills the aforementioned deficiencies by providing a cooking device and system for foods that are wrapped in bacon or other meat items, such as salami or slices of beef, or dough or vegetables, as non-limiting examples. The device provides a convenient way to hold the food in place and keep the food from becoming overly greasy or soggy during the cooking process.

The invention, in one example embodiment, is a silicone cooking apparatus consisting of a tray that holds the individual bacon wrapping devices in place. The apparatus may have silicone holders for the bacon wrapped foods. The silicone holders have slots that allow access for a toothpick (optional) to penetrate the bacon or the food item itself The apparatus, in one example embodiment, is constructed of a non-stick material such as silicone to prevent foods from sticking to the tray and the holder. The apparatus fulfills the need for an easy to use and cleaner device to create bacon-wrapped appetizers and entrées.

It is an advantage of the apparatus to have drainage holes at the bottom of the bacon wrap holders that allows grease (and other fluids) to be pulled away from the food item while it cooks. It is still further an advantage of the invention to have a tray with a surrounding inner edge that is a reservoir for grease. During the cooking process grease drains to the edges of the tray to keep the food item being cooked from being saturated in grease.

In one example embodiment, there is provided a composite foodstuff cooking assembly including a base member having a reservoir and a tray portion disposed over the base member and the reservoir. The cooking assembly also includes a foodstuff holder having a holder plate and at least two elongate prongs having lower end portions integral with the holder plate, each prong extending upwardly from the holder plate and being spaced apart so as to hold the composite foodstuff in an upright position on the holder plate, wherein the foodstuff holder is disposed on the base member with the prongs in an upright position. In one example embodiment, the base member has a reservoir that includes one or more openings formed therein to permit fluid to exit the reservoir. In a related embodiment, the tray portion of the cooking assembly includes one or more openings adjacent the foodstuff holder.

In another example embodiment, there is provided a cooking system for cooking composite foodstuffs including a base member having a reservoir and a tray portion disposed over the base member and the reservoir and a foodstuff holder having a holder plate and at least two elongate prongs having lower end portions integral with the holder plate, each prong extending upwardly from the holder plate and being spaced apart so as to hold the composite foodstuff in an upright position on the holder plate, wherein the foodstuff holder is disposed on the base member with the prongs in an upright position. The cooking system further includes a support pan having a substantially planar bottom surface and at least one sidewall extending upward from the planar bottom surface, the support pan adapted to support the combination base member and foodstuff holder. In a related embodiment, the support pan of the cooking system further includes a rack member disposed over the planar bottom surface of the support pan, the rack member having a plurality of openings or notches there through for supporting one or more base member and foodstuff holder combinations during a cooking process to also allow fluids to flow from the foodstuff holders.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWINGS

FIG. 3 illustrates an isolated view of the tray that holds the bacon wrapping units.

DETAILED DESCRIPTION OF THE INVENTION

Figure 1A:
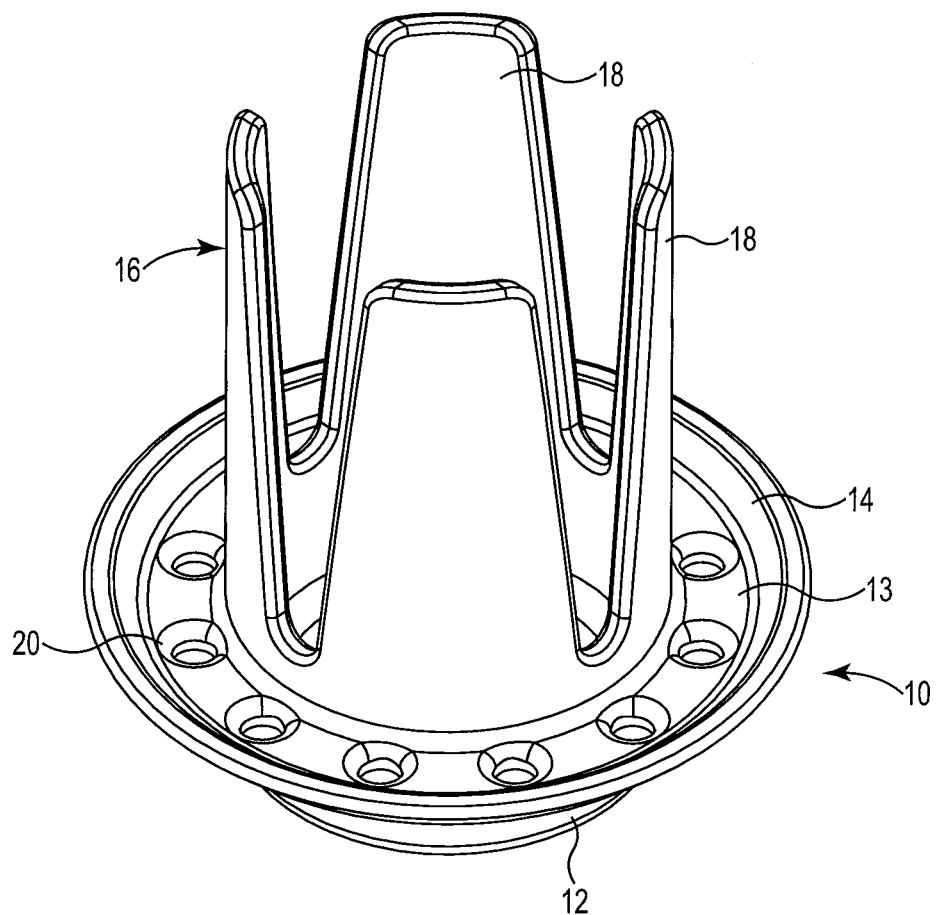
FIGS. 1A-1F illustrate an isolated view of first, second and third embodiments of bacon wrapping units according to the teachings of the invention.
Figure 1B:
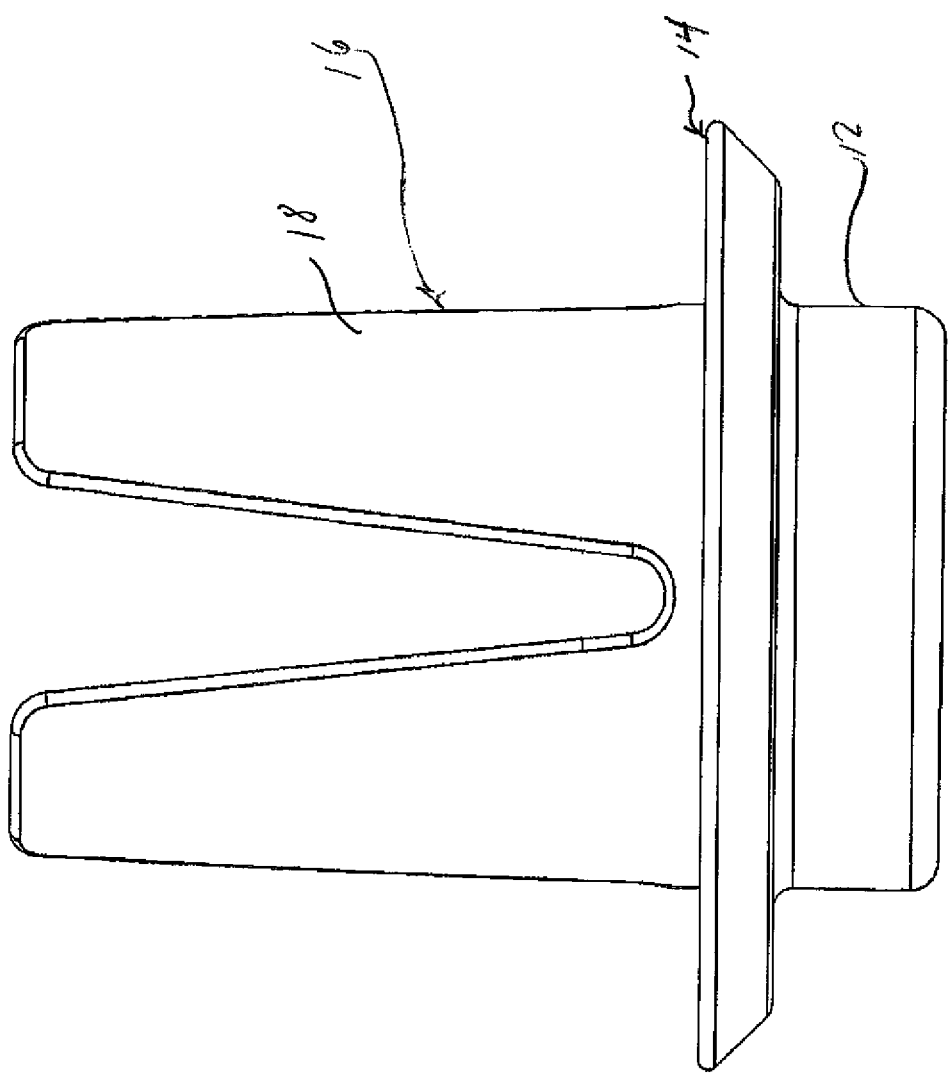
Figure 1C:
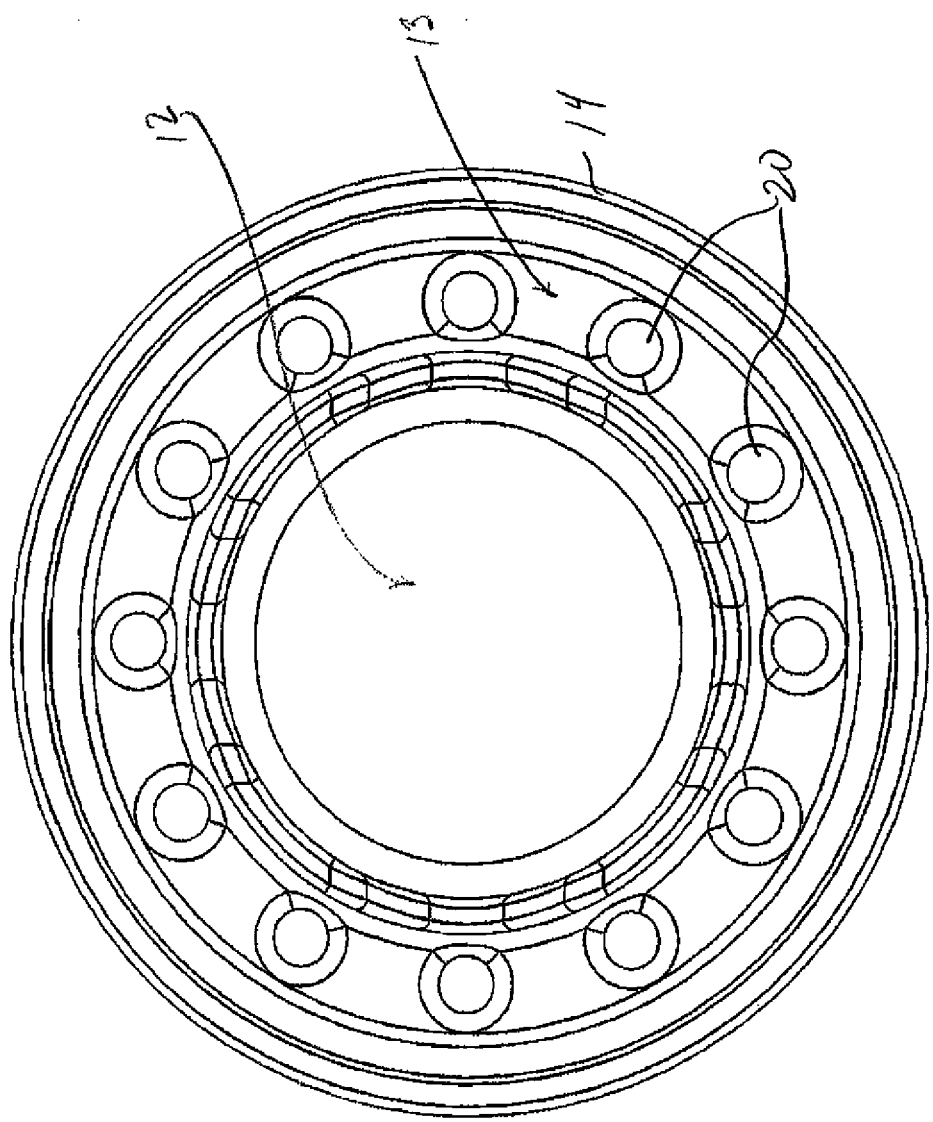

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

The various embodiments of the invention are directed to be a cooking device and system for foods that are wrapped in bacon or other food items. The invention is a tray that holds a number of holders that hold bacon-wrapped food items while they cook in an oven or toaster oven, microwave or grill (when made out of metal such as aluminum or ceramic). The cooking holders hold bacon wrapped food items upright and in place during the cooking process. The entire cooking holder may be made of silicone or other similar materials so the food item slides easily off the cooking apparatus when cooking is complete. The cooking tray is designed to allow grease to flow away from the food into a reservoir located around the edges of the tray.

In a related embodiment, the cooking system described herein can also be used with cold foods that need to be wrapped and kept cool or cold before serving and can benefit from keeping its shape in the food wrapping units and tray. In yet another example embodiment, the cooking system is made out of microwaveable materials that can also be disposed of for one-time use when the user is done cooking with them. The system can be configured to be collapsible and foldable, making it easier to include in commercial packaging with other foods (such as selling it with bacon as a cooking kit).

Referring to the figures, FIGS. 1A-1F illustrate various components of an example embodiment of a composite foodstuff holder assembly 10, which in this example embodiment is a bacon wrap holder or holder assembly 10. Composite foodstuffs that can be placed in holder assembly 10, other than bacon-wrapped foods, include but are not limited to dough-wrapped foods, rice-wrapped foods, vegetable-wrapped foods, seaweed-wrapped and meat-wrapped foods. In this example embodiment, bacon wrap holder assembly 10 has a base member 12 that includes a tray portion 13 with an outer ring 14, and a slotted or pronged holder assembly 16 disposed on base member 12 and tray portion 13 with a rim 14. Base member 12 is configured to provide stability while inserted in a holding or cooking pan 30. In this example embodiment, base member 12 and tray portion 13 are circular in shape, but in other example embodiments other shapes include square, rectangular, and elliptical or oval. In this example embodiment, tray portion 13 includes one or more holes or openings 20 that allow a liquid or fluid, such as grease (or food juices or water), to flow from the foodstuff in holder assembly 16 to the support or cooking pan 30. Holes 20 may be any size or shape that allows liquid, but preferably not solids to flow there through to a reservoir underneath tray portion 13.

In this example embodiment, slotted or prong holder 16 extends upwards from base member 12 and includes two or more finger-like projections or elongate prongs 18 that form the foodstuff holding structure. Elongate prongs 18 are spaced apart as they project upwards in the shape of the base 12. Slotted holder 16 is configured to allow for use of toothpicks (or other cooking utensils) to extend between projections 18 to help secure the bacon-wrapped food item and lift the food out of the device. In a related embodiment, the slotted holder is configured to suspend part or all of the food to be cooked (or chilled) off the base and not necessarily in an upright position.

In a related example embodiment, a composite foodstuff cooking assembly is provided that includes a base member having a reservoir and a tray portion disposed over the base member and the reservoir, the tray portion including at least one opening formed therein to permit fluid drainage there through to the reservoir. The composite foodstuff assembly also includes a foodstuff holder having a holder plate and at least two elongate prongs having lower end portions integral with the holder plate, each prong extending upwardly from the holder plate and being spaced apart so as to hold the composite foodstuff in an upright position on the holder plate, wherein the foodstuff holder is disposed on the base member with the prongs in an upright position and adjacent the at least one opening such that fluids generated during cooking from the composite foodstuff drain though the at least one opening and into the reservoir. In one example embodiment, the tray portion includes a plurality of openings adjacent the foodstuff holder.

In related example embodiments, the foodstuff holder includes more than two elongate prongs equally space apart around the holder plate and the base member and a shape of the base member, the tray portion and the foodstuff holder is one of a substantially round, a square shape, a rectangular shape, and an elliptical or oval shape. In related embodiments, the elongate prongs of the cooking assembly are substantially trapezoidal in form having a base in contact with the holder plate that is wider than a top of the prong and a height of the elongate prongs selected so as to securely hold the composite foodstuff upright in the foodstuff holder. In related embodiments, the elongate prong configuration or shape is selected from the group consisting of a cylinder rod, a triangle, a rectangle and a square and the base member, the tray portion and the foodstuff holder are formed from heat resistant and microwavable material.

Figure 1D:
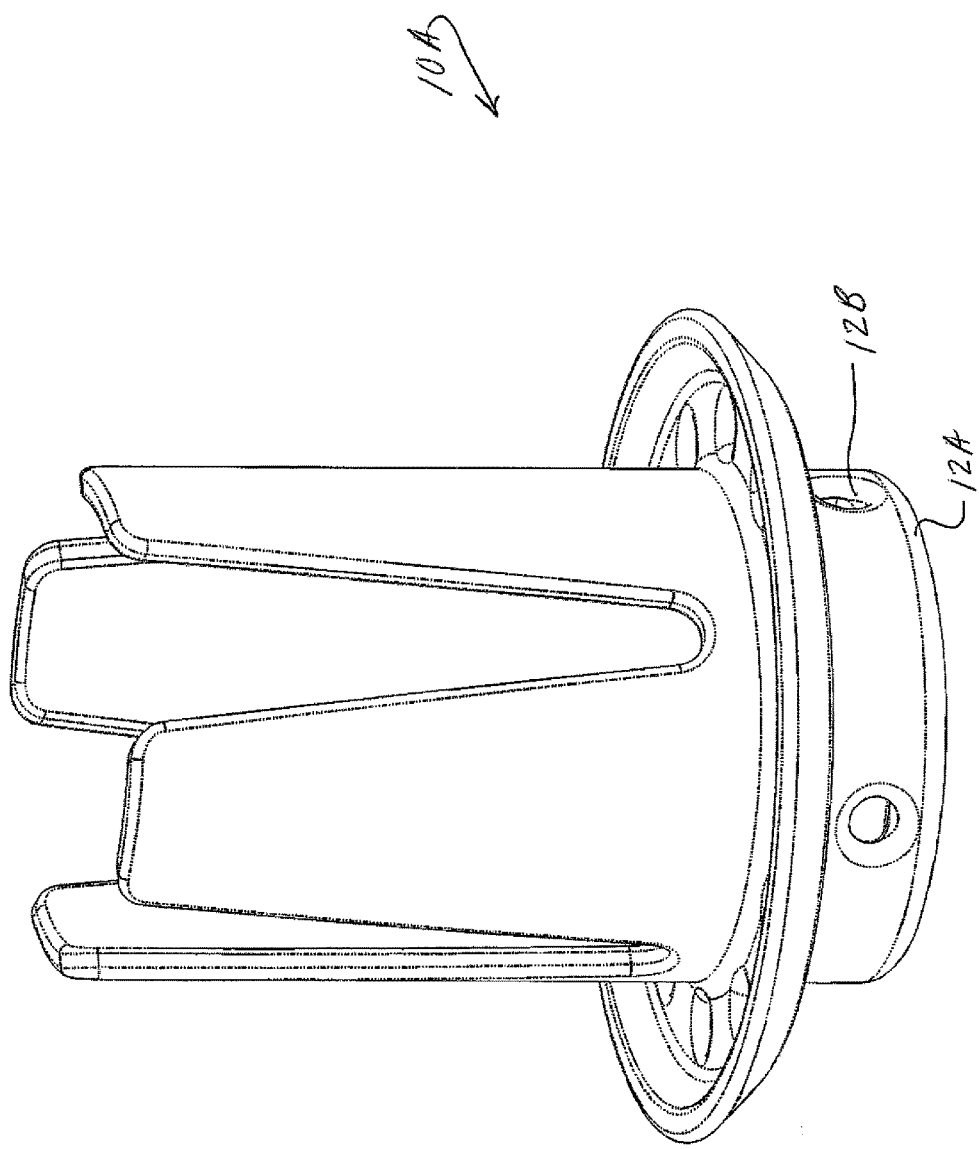
Figure 1E:
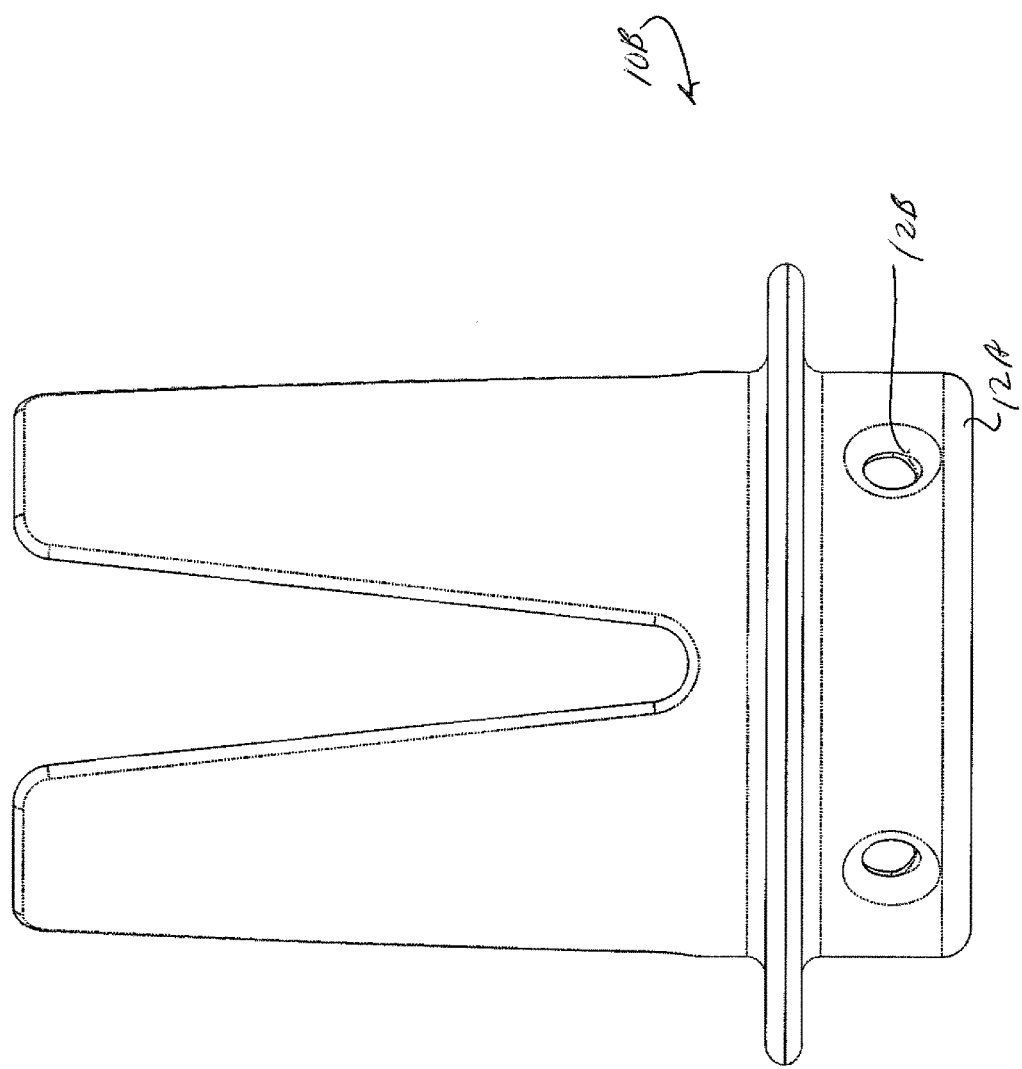
Figure 1F:
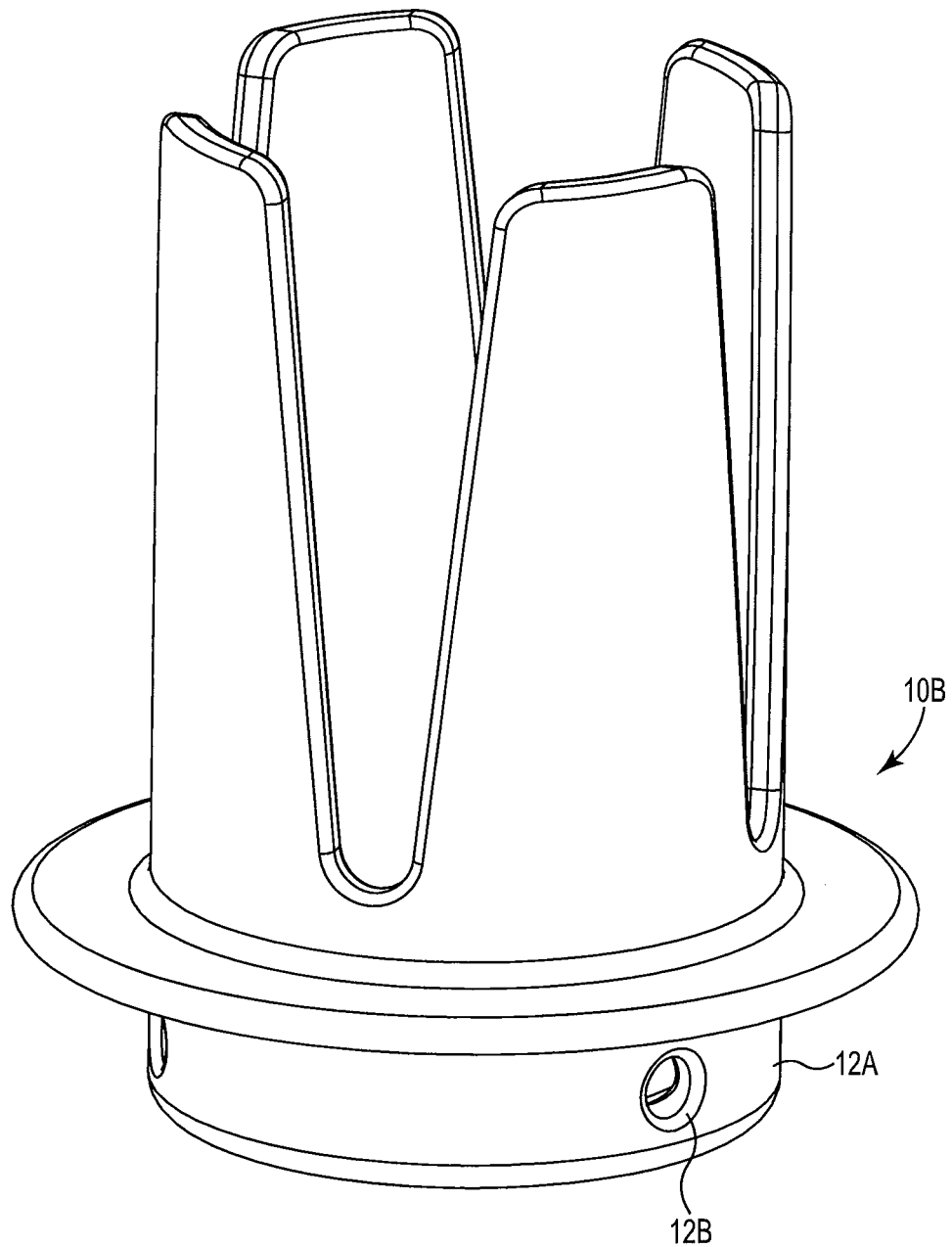

Referring now to FIG. 1D, there is illustrated a second embodiment of a bacon wrapping unit 10A with a base 12A have at least one or more holes 12B to provide for drainage of fluids from a food item that is wrapped. In FIGS. 1E and 1F there is illustrated front and perspective views of a third embodiment of a bacon wrapping unit or assembly 10B with a base 12A have at least one or more holes 12B to provide for drainage of fluids from a food item that is wrapped but omits holes 20 of first bacon wrapping unit 10. Bacon wrapping units 10A and 10B include substantially the same components as unit or assembly 10, with the additional feature of one or more holes or apertures 12B in base 12A, to facilitate drainage of fluids from the food item that is bacon-wrapped (or wrapped or covered with other food items, as described above). In any of the bacon wrapping units described above, in a related embodiment, an individual cover is included to cover each food pod or assembly. In another related embodiment, a sheet cover is included that allows one or more pods or assemblies 10 to snap up into the sheet cover thereby eliminating an underneath support tray for one or more of the food pods.

Figure 2A:
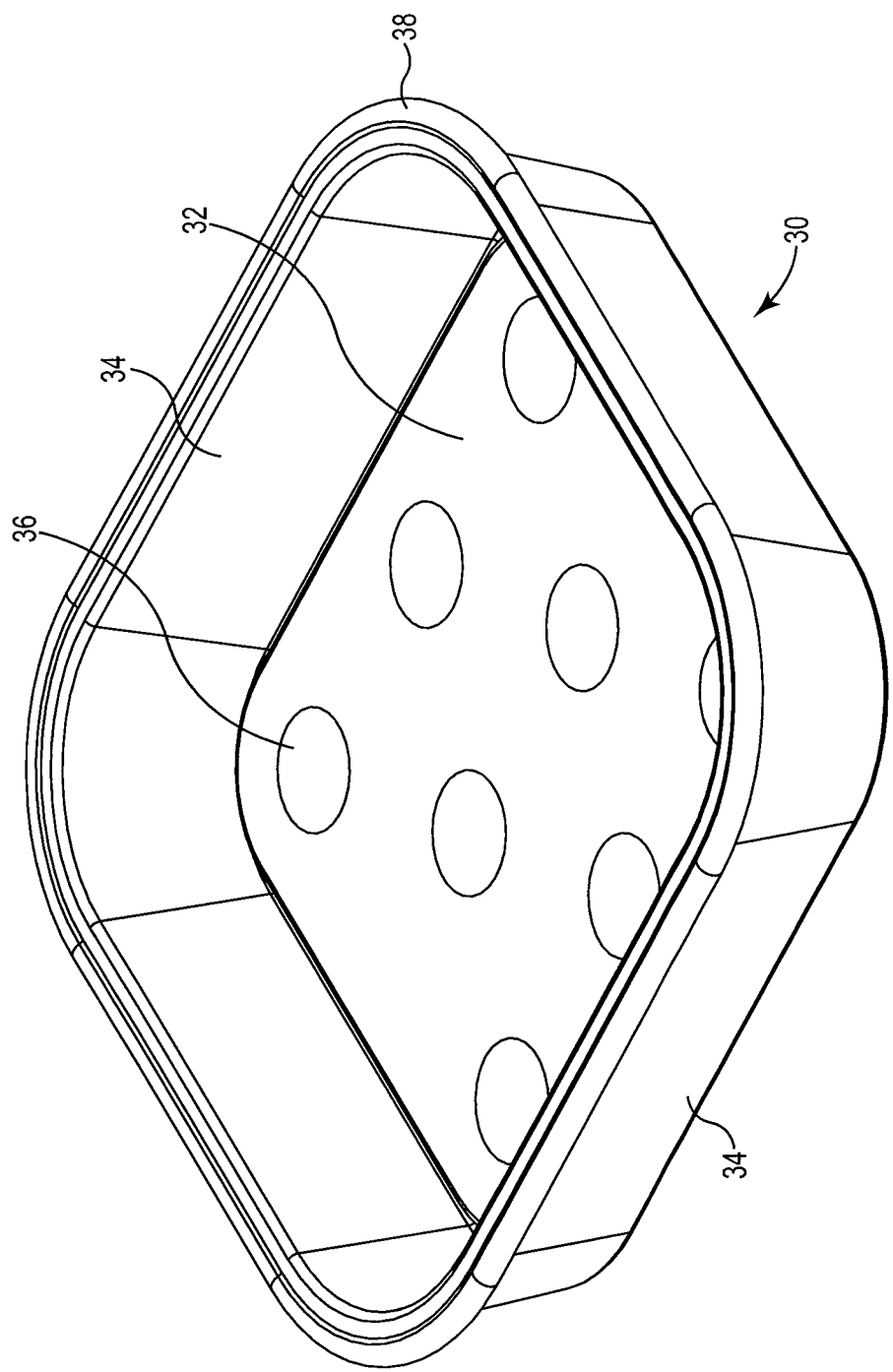
FIGS. 2A-2B illustrates an isolated view of the tray without bacon wrapping units in place.
Figure 2B:
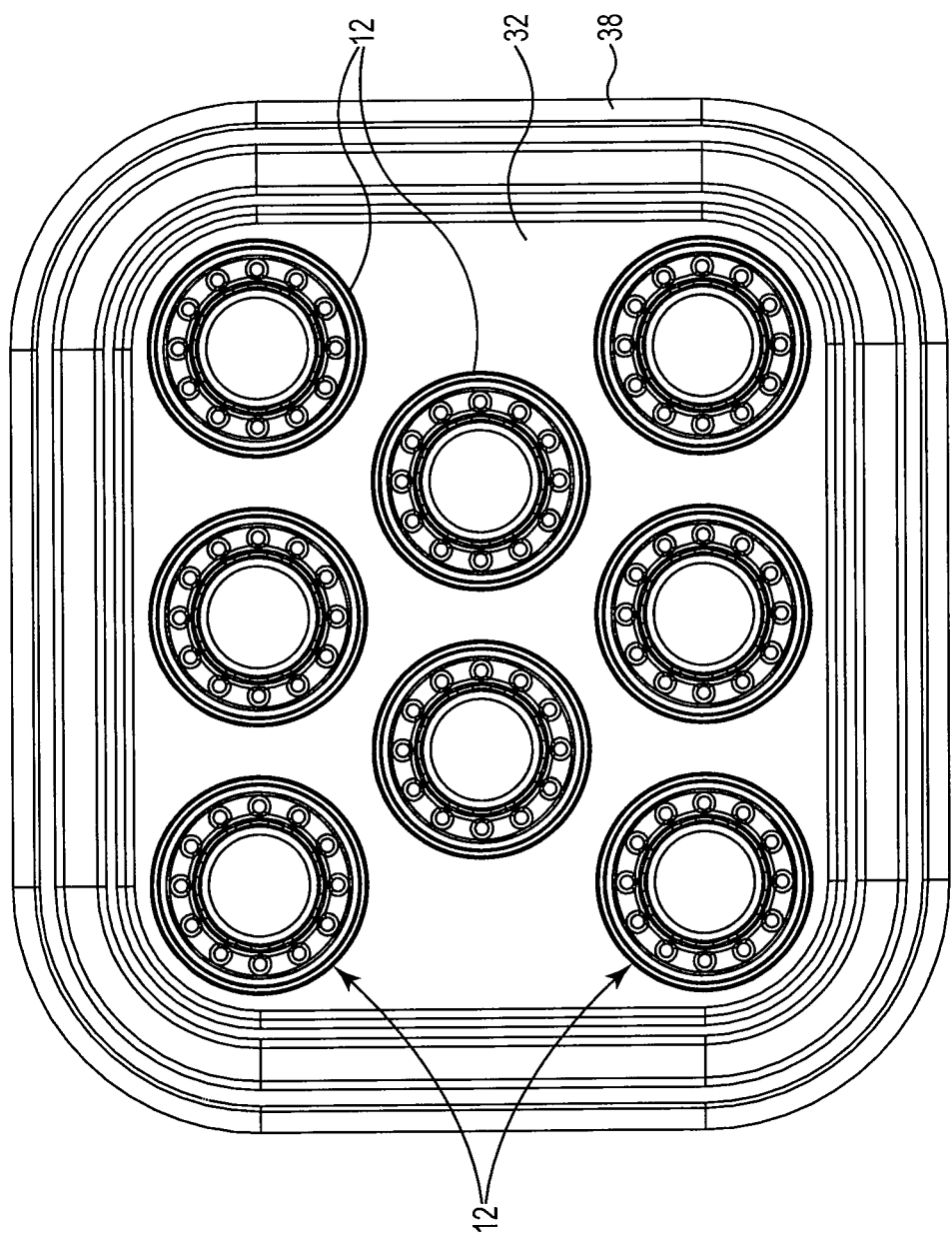

Referring now to FIGS. 2A-2B, there is illustrated a perspective view of a support pan 30 and a top view of support pan 30 which include a plurality of holder assemblies 10 according to an example embodiment the invention. In this example embodiment, support pan 30 (without holder assemblies 10) includes a rack or base plate member 32 (supported by a planar bottom 31 of support pan 30, not shown) and sidewalls 34 that extend upward from planar bottom 31 and rack member or base plate 32. In this example embodiment, sidewalls 34 are configured to extend upwards a sufficient height to hold any liquid that may flow from a composite foodstuff located in bacon-wrapped holder assembly 10 while the rack member assists to firmly hold one or more holder assemblies 10 (see FIG. 3) within pan 30. In this example embodiment, at an upper edge of sidewalls 34 is included an optional lip or ridge 38 that enhances gripping ability of support pan 30 when removing pan 30 from an oven or transporting pan 30 to another area. In this example embodiment, rack member 32 also includes a plurality of holder notches or openings 36 sized and shaped to hold bacon wrap holders 10 up in an upright position. In a related embodiment, holder openings or notches 36 can be upright nubs or protrusions that also grasp the bacon wrap holders 10 having a corresponding notch underneath base member 12. In another related embodiment, rack member or base plate 32 is eliminated when notches or openings 36 (or ridges that form notches) are molded or formed into the planar bottom of support pan 30, thereby reducing the number of components. In other example embodiments, support pan 30 is formed into various geometric configurations including round, elliptical or oval, square and rectangle shapes.

Referring now to FIG. 3, there is illustrated a perspective view of a cooking assembly 40 that includes support pan 30 with a plurality of composite foodstuff or bacon-wrapped holders 10 firmly held in notches 36 within rack member 32. In another example embodiment, support pan 30 includes a cover (not shown) to promote even cooking in an oven or a grill.

In a related embodiment, a cooking system for cooking composite foodstuffs similar to assembly 10 and support pan 30 is provided. In this example embodiment, the cooking system includes a base member having a reservoir and a tray portion disposed over the base member and the reservoir, the tray portion including at least one opening formed therein to permit fluid drainage there through to the reservoir. The cooking system also includes a foodstuff holder having a holder plate and at least two elongate prongs having lower end portions integral with the holder plate, each prong extending upwardly from the holder plate and being spaced apart so as to hold the composite foodstuff in an upright position on the holder plate, wherein the foodstuff holder is disposed on the base member with the prongs in an upright position and adjacent the at least one opening such that grease and juices from the composite foodstuff generated during cooking drain though the at least one opening and into the reservoir. The cooking assembly further includes a support pan having a substantially planar bottom surface and at least one sidewall extending upward from the planar bottom surface, the support pan adapted to support the combination base member and foodstuff holder. In this example embodiment, the composite foodstuff includes a bacon-wrapped food item.

In one example embodiment, the planar bottom surface further includes depressions or indentations formed therein for receiving the combination base member and foodstuff holder base member. In a related example embodiment, the support pan further includes a rack member disposed over the planar bottom surface of the support pan, the rack member having a plurality of openings or notches there through for supporting one or more base member and foodstuff holder combinations during a cooking process to also allow fluids to flow from the foodstuff holders and the rack member is made from a material selected from the group consisting of metal, glass, ceramic, a heat resistant plastic or silicone material. In related example embodiments, a shape of the support pan is selected from the group consisting of a round shape, an elliptical shape, a square shape and a rectangular shape.

In various example embodiments, pan 30 is made from glass, metal, heat resistant plastic or silicone, ceramic, or other oven safe material. Holders 10 may be made from glass, metal, ceramic, silicone, or other oven safe material. In an example embodiment, holder 10 is made from a nonstick material. In yet another related embodiment, holder 10 is formed as a wire frame in a similar shape to that illustrated in FIG. 1 but need not be solid material.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

The invention claimed is:

1. A cooking system for cooking composite foodstuffs comprising:
    a base member having a reservoir and a tray portion disposed over the base member and the reservoir;
    a foodstuff holder having a holder plate and at least two elongate prongs having lower end portions integral with the holder plate, each prong extending upwardly from the holder plate and being spaced apart so as to hold the composite foodstuff in an upright position on the holder plate, wherein the foodstuff holder is disposed on the base member with the prongs in an upright position; and
    a support pan having a substantially planar bottom surface and at least one sidewall extending upward from the planar bottom surface, the support pan adapted to support the combination base member and foodstuff holder.

2. The cooking system of claim 1, wherein the composite foodstuff includes a bacon-wrapped food item.

3. The cooking system of claim 1, wherein the support pan further includes a rack member disposed over the planar bottom surface of the support pan, the rack member having a plurality of openings or notches there through for supporting one or more base member and foodstuff holder combinations during a cooking process to also allow fluids to flow from the foodstuff holders.

4. The cooking system of claim 1, wherein the planar bottom surface further includes depressions or indentations formed therein for receiving the combination base member and foodstuff holder base member.

5. The cooking system of claim 1, wherein a shape of the support pan is selected from the group consisting of a round shape, an elliptical shape, a square shape and a rectangular shape.

6. The cooking system of claim 3, wherein the rack member is made from a material selected from the group consisting of metal, glass, ceramic, a heat resistant plastic or silicone material.

7. The cooking assembly of claim 1, wherein the base member having a reservoir includes one or more openings formed therein to permit fluid to exit the reservoir.

8. The cooking assembly of claim 7, wherein the tray portion includes one or more openings adjacent the foodstuff holder.

9. The cooking assembly of claim 1, wherein the tray portion includes one or more openings adjacent the foodstuff holder.

10. The cooking assembly of claim 1, wherein the elongate prongs are substantially trapezoidal in form having a base in contact with the holder plate that is wider than a top of the prong.

11. The cooking assembly of claim 1, wherein a shape of the base member, the tray portion and the foodstuff holder is substantially round.

12. The cooking assembly of claim 1, wherein a shape of the base member, the tray portion and the foodstuff holder is selected from the group consisting of a square shape, a rectangular shape and an elliptical or oval shape.

13. The cooking assembly of claim 1, wherein the base member, the tray portion and the foodstuff holder are formed from heat resistant and microwavable material.

14. The cooking assembly of claim 1, wherein the elongate prong configuration is selected from the group consisting of a cylinder rod, a triangle, a rectangle and a square.

* * * * *